US006769177B2

(12) United States Patent
Koike et al.

(10) Patent No.: US 6,769,177 B2
(45) Date of Patent: Aug. 3, 2004

(54) METHOD OF PRODUCING INK-JET RECORDING HEAD

(75) Inventors: Shuji Koike, Setagaya (JP); Yoshiaki Sakamoto, Kawasaki (JP); Tomohisa Shingai, Kawasaki (JP); Seigen Otani, Kawasaki (JP); Toshihiko Osada, Kawasaki (JP); Kazuaki Kurihara, Kawasaki (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/175,156

(22) Filed: Jun. 20, 2002

(65) Prior Publication Data

US 2003/0015492 A1 Jan. 23, 2003

Related U.S. Application Data

(63) Continuation of application No. PCT/JP99/07258, filed on Dec. 24, 1999.

(51) Int. Cl.[7] .......................... B23P 17/00; B41J 2/045; G11B 5/127

(52) U.S. Cl. ....................... 29/890.1; 29/25.35; 29/846; 29/847; 347/68; 216/27

(58) Field of Search ............................ 29/25.35, 890.1, 29/846, 847; 347/68, 69, 71, 94; 216/27, 66, 75; 204/192.11, 192.34

(56) References Cited

U.S. PATENT DOCUMENTS

| | | | | |
|---|---|---|---|---|
| 5,265,315 A | * | 11/1993 | Hoisington et al. | 29/25.35 |
| 5,475,279 A | * | 12/1995 | Takeuchi et al. | 310/331 |
| 5,619,234 A | * | 4/1997 | Nagato et al. | 347/55 |
| 5,719,607 A | * | 2/1998 | Hasegawa et al. | 347/70 |
| 5,802,686 A | * | 9/1998 | Shimada et al. | 29/25.35 |
| 5,933,167 A | * | 8/1999 | Shimada et al. | 347/70 |
| 6,019,458 A | * | 2/2000 | Shimada et al. | 347/70 |

FOREIGN PATENT DOCUMENTS

| | | |
|---|---|---|
| EP | 0 786 345 A2 | 7/1997 |
| JP | 5-109668 | 4/1993 |
| JP | 9-286104 | 11/1997 |
| JP | 10-128973 | 5/1998 |
| JP | 2000-117990 | 4/2000 |
| JP | 2000-190492 | 7/2000 |

* cited by examiner

*Primary Examiner*—Carl J. Arbes
*Assistant Examiner*—Tai Nguyen
(74) *Attorney, Agent, or Firm*—Armstrong, Kratz, Quintos, Hanson & Brooks, LLP

(57) ABSTRACT

A method of producing an ink-jet recording head using ion milling is provided. The method includes the steps of forming a piezoelectric layer subsequent to an electrode layer on a substrate by using a thin-film deposition technology, forming an energy-generating element for generating energy for ink ejection by etching the electrode layer and the piezoelectric layer simultaneously by ion milling, and removing a fence formed by deposits of mixed fine powders including those etched off the electrode layer and the piezoelectric layer.

6 Claims, 19 Drawing Sheets

100

METHOD OF PRODUCING INK-JET RECORDING HEAD

This application is a continuation of International Application PCT/JP99/07258 filed Dec. 24, 1999.

TECHNICAL FIELD

The present invention relates to methods of producing an ink-jet recording head, and more particularly to a method of producing an ink-jet head using a thin-film deposition technology such as ion milling.

Conventionally, a wire-driving printer head has been widely used as a printer head. The wire-driving printer head performs printing by driving wires magnetically and pressing the wires against a platen with a paper sheet or an ink ribbon interposed therebetween. The wire-dot printer head, however, has many disadvantages such as large power consumption, noise generation, and low resolution, thus leaving much to be desired as a printer device.

Therefore, a printer employing an ink-jet recording head using piezoelectric elements or air bubbles generated by heat has been developed lately. The ink-jet recording head, which is driven noiselessly with low power consumption and achieves high resolution, has come to the front as a preferred printer device.

BACKGROUND ART

The ink-jet recording head basically includes nozzles, ink chambers, an ink supply system, an ink tank, and a pressure-generating part. In a printer using the ink-jet recording head, displacement generated in the pressure-generating part is transmitted to the ink chambers as pressure so that ink particles are sprayed from the nozzles, thereby recording characters or images on a recording medium such as a sheet of paper.

According to the conventional known method, a thin-plate piezoelectric element is attached to one side of the outer wall of an ink chamber as a pressure-generating part. By supplying a pulse-like voltage to the piezoelectric element, a composite plate formed of the piezoelectric element and the outer wall of the ink chamber deflects. Displacement generated by the deflection produces pressure that is applied to the ink chamber, so that ink is sprayed.

FIG. 1 is a schematic diagram showing an ink-jet recording head 10 and its periphery of a conventional printer 1, and FIG. 2 is a perspective view of the ink-jet recording head 10, showing the outline of a configuration thereof.

In FIG. 1, the ink-jet recording head 10 is attached to the-lower surface of a carriage 2. The ink-jet recording head 10 is positioned between a feed roller 3 and an eject roller 4 so as to oppose a platen 5. The carriage 2 includes an ink tank 6, and is provided to be movable in a direction perpendicular to the surface of the FIG. 1 sheet. A paper sheet 7 is pinched between a pinch roller 8 and the feed roller 3 and further between a pinch roller 9 and the eject roller 4 to be conveyed in the direction indicated by the arrow A. The ink-jet recording head 10 is driven and the carriage 2 is moved in the direction perpendicular to the sheet surface so that the ink-jet recording head 10 performs printing on the paper sheet 7. The printed paper sheet 7 is stored in a stacker 20.

As shown in FIG. 2, the ink-jet recording head 10 includes piezoelectric elements 11, individual electrodes 12 formed on the piezoelectric elements 11, a nozzle plate 14 having nozzles 13 formed therein, metal or resin ink chamber walls 17 forming, with the nozzle plate 14, ink chambers 15 corresponding to the nozzles 13, and a diaphragm 16.

The nozzles 13 and the diaphragm 16 are positioned to oppose the ink chambers 15. The periphery of the ink chambers 15 and the corresponding periphery of the diaphragm 16 are firmly connected, and the piezoelectric elements 11 cause the respective corresponding parts of the diaphragm 16 to be displaced as indicated by the broken line in FIG. 2. Voltages are applied to the piezoelectric elements 11 by supplying electrical signals from the main body of the printer to the individual piezoelectric elements 11 through a printed board not shown in the drawing. The piezoelectric elements 11 supplied with the voltages contract or expand to cause pressure in the respective ink chambers 15 so that ink is sprayed. Thereby, printing is performed on the recording medium.

The piezoelectric elements 11 are formed on the above-described conventional ink-jet recording head 10 shown in FIG. 2 by attaching plate-like piezoelectric elements to positions corresponding to the ink chambers 15 or by first attaching a piezoelectric element over the ink chambers 15 and then dividing the piezoelectric element according to the ink chambers 15.

If a thin piezoelectric element (smaller than 50 $\mu$m) is employed in the thus produced conventional ink-jet recording head 10 in order to reduce the size thereof, a variation in the thickness of an adhesive agent used for the attachment causes variations in the displacement of the piezoelectric elements so that the characteristic of the ink head is deteriorated. Further, the piezoelectric element of this type has a problem in that a crack is made therein at the time of attachment.

Some inventors of the present invention, together with another inventor, have proposed a method of producing an ink-jet recording head using a thin-film deposition technology in order to eliminate the above-described disadvantage. However, there is still room for improvement in this method.

DISCLOSURE OF THE INVENTION

That is, a principal object of the present invention is to provide a method of producing a downsized ink-jet recording head of higher accuracy at low cost by making further improvements with respect to a method of producing an ink-jet recording head using a thin-film deposition technology.

The above object of the present invention is achieved by a method of producing an ink-jet recording head, the method including the steps of forming a piezoelectric layer subsequent to an electrode layer on a substrate by using a thin-film deposition technology, forming an energy-generating element for generating energy for ink ejection by etching the electrode layer and the piezoelectric layer simultaneously by ion milling, and removing a fence formed by deposits of mixed fine powders including those etched off the electrode layer and the piezoelectric layer by the ion milling.

In the present invention, an energy-generating element having integrality can be produced since the electrode layer and the piezoelectric layer are etched simultaneously by ion milling.

Further, a large area can be processed by etching by ion milling, and etching anisotropy is high. Accordingly, the shape of the energy-generating element can be designed freely, and its etched section is vertical without formation of unnecessary tapers.

Deposits of mixed fine powders generated by the ion milling are formed on the energy-generating element.

However, by the step of removing the deposits, the periphery of the energy-generating element can be planarized before the subsequent production process is performed, so that an ink-jet recording head having a proper energy-generating element can be produced.

In the above-described step of removing the fence, the deposits of the mixed fine powders can be removed by using ion milling.

An ion milling angle herein is preferably greater than that in the step of forming the energy-generating element.

The ion milling angle in the step of removing the fence is smaller by five degrees than θ obtained from the following equation, and the ion milling angle in the step of forming the energy-generating element preferably falls between 0 and 45°.

The ion milling angle for removing the fence differs depending on an element array space, a pattern resist thickness (wall height), and a pattern opening width, and an optimum ion milling angle is determined based on each dimension. For instance, a maximum angle in emission of argon (Ar) gas is determined by the following equation defined by the depth (from the surface of a resist pattern to a bottom formed after ion milling) and the width of an opening part:

$$\theta=\arctan(\text{width}/\text{depth})$$

That is, the ion milling angle for removing the fence is set within the range of 0° to θ of the above-described equation, preferably between θ (maximum) and θ-5° approximately. In the ion milling for removing the fence, where etching is performed as in the ion milling for forming the pattern, the bottom part is etched to induce generation of a fence by contrast if the emission angle is set too upright (approximated to 0°).

CMP or wet etching can be employed in the step of removing the fence.

BEST MODE FOR CARRYING OUT THE INVENTION

Figure 1:
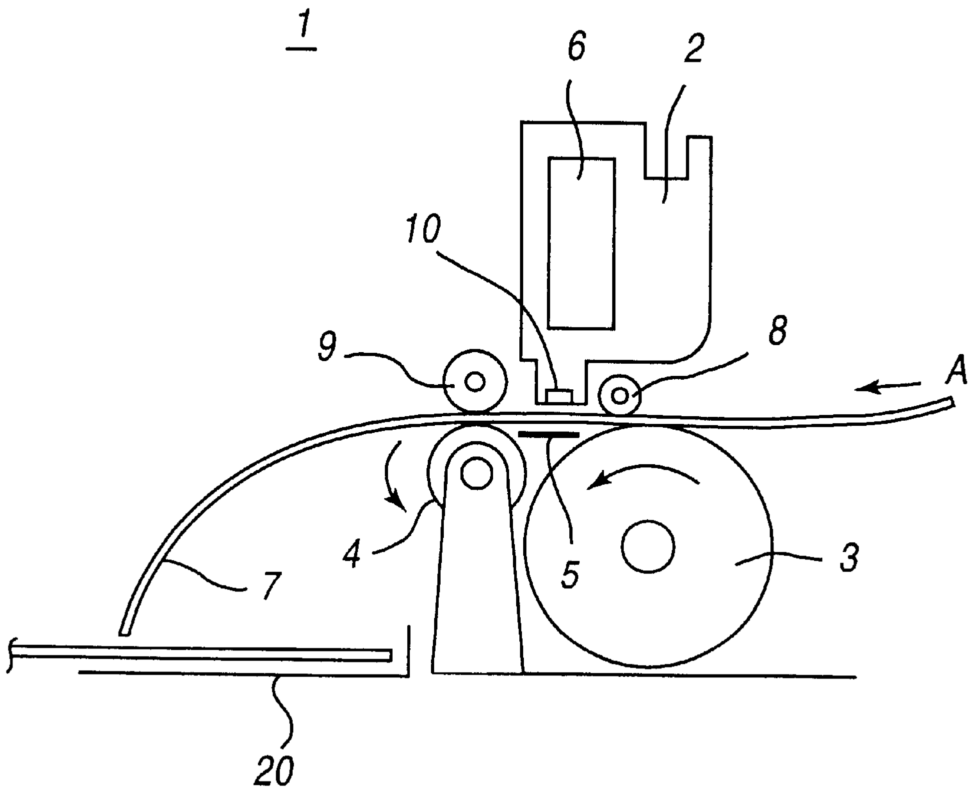
FIG. 1 PRIOR ART
FIG. 1 is a schematic diagram showing an ink-jet recording head and its periphery of a conventional printer.
Figure 2:
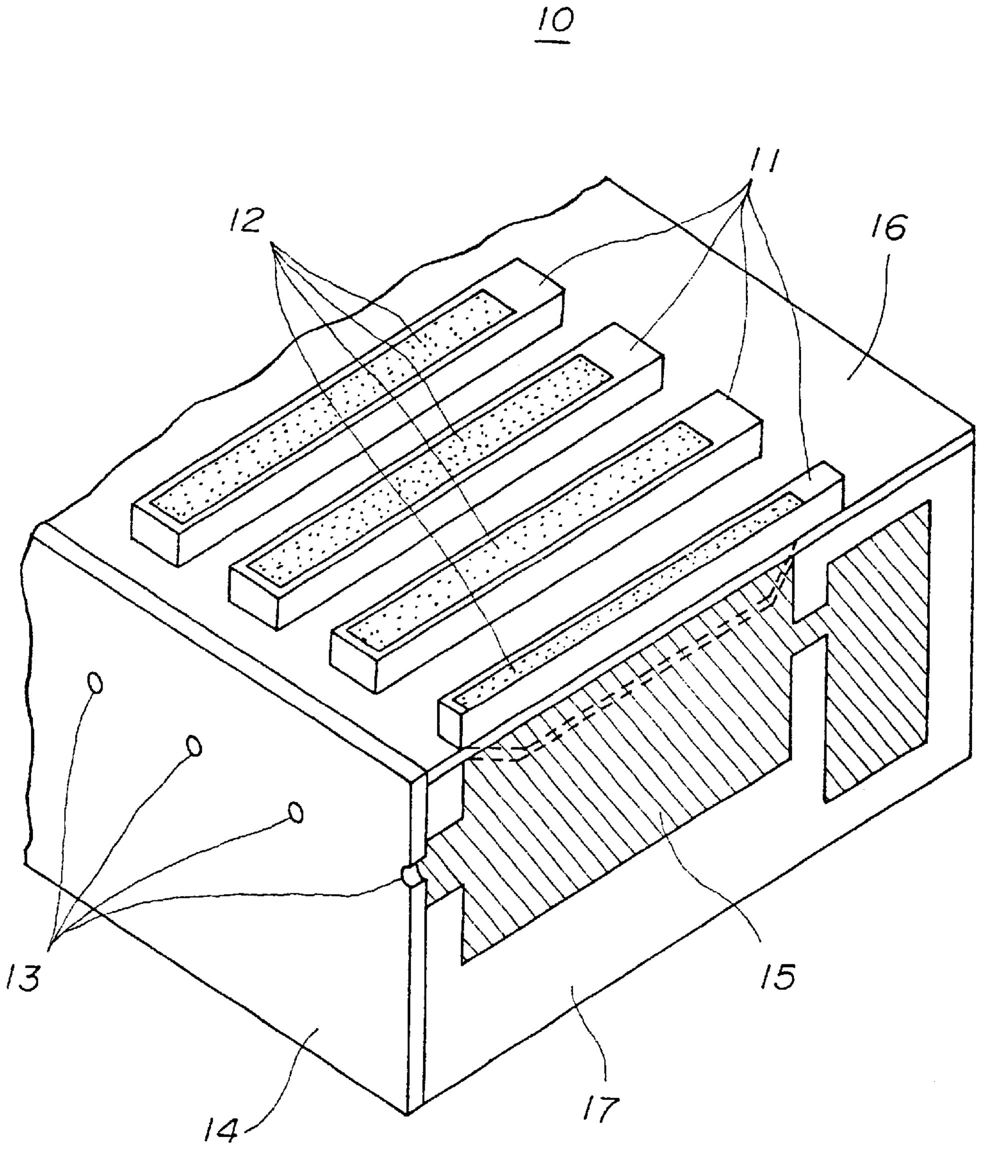
FIG. 2 PRIOR ART
FIG. 2 is a perspective view of the ink-jet recording head of FIG. 1, showing an outline of a configuration thereof.

The present invention relates to improvement of the ink-jet recording head using the thin-film deposition technology proposed previously by the inventors including some inventors of the present invention. In order to help understand the present invention, a description will first be given of the ink-jet recording head proposed by the inventors and of improvements to be made in the present invention, and then, a detailed description will be given of the present invention.

(Previously Proposed Invention)

In a bid to provide an ink-jet recording head reduced further in size from a totally novel point of view, the inventors have devised, through intensive studies, an ink-jet recording head produced by using a thin-film deposition method. A patent application has been filed for the ink-jet recording head (Japanese Patent Application No. 10-297919). A brief description will be given of this invention. FIGS. 3(A) through 3(H) are diagrams showing a production process of an ink-jet recording head 30 devised previously by the inventors.

The ink-jet recording head 30 is produced through steps shown in FIGS. 3(A) through 3(H). An electrode layer 31 is formed of a platinum (Pt) film on a magnesium oxide (MgO) substrate 40 by sputtering. The electrode layer 31 is patterned and divided so that individualized electrode layer (hereinafter referred to as individual electrodes) 38 is formed (FIGS. 3(A), (B)). Next, a piezoelectric layer 32 is formed thereon by sputtering (FIG. 3(C)). The piezoelectric layer 32 is patterned and divided so as to correspond to the individual electrodes 38. Formed thereby are energy-generating elements 37, which are formed of laminations of individualized piezoelectric layers (hereinafter referred to as piezoelectric elements) 33 and the individual electrodes 38 and serve as a part generating energy for ink ejection (FIG. 3(D)). Next, a polyimide layer 41 is formed on the upper surface of the MgO substrate 40 for planarization thereof (FIG. 3(E)). Next, sputtering of chromium (Cr) is performed on the upper surface thereof so that a diaphragm 34, which is a Cr sputtering film, is formed (FIG. 3(F)). Next, a dry film 42 is applied on the diaphragm 34, and exposure and development are performed using a mask on the dry film 42 at positions corresponding to the energy-generating elements 37 so that pressure chambers 35 are formed (FIG. 3(G)). Finally, the MgO substrate 40 is removed by etching. Thus, an upper half body 30A of the ink-jet recording head 30 is formed. A lower half body 30B that has the lower concave parts of the pressure chambers 35 and a nozzle plate 44 having nozzles corresponding to the pressure chambers 35 is joined to the upper half body 30A so that the ink-jet recording head is formed (FIG. 3(H)).

Figure 4:
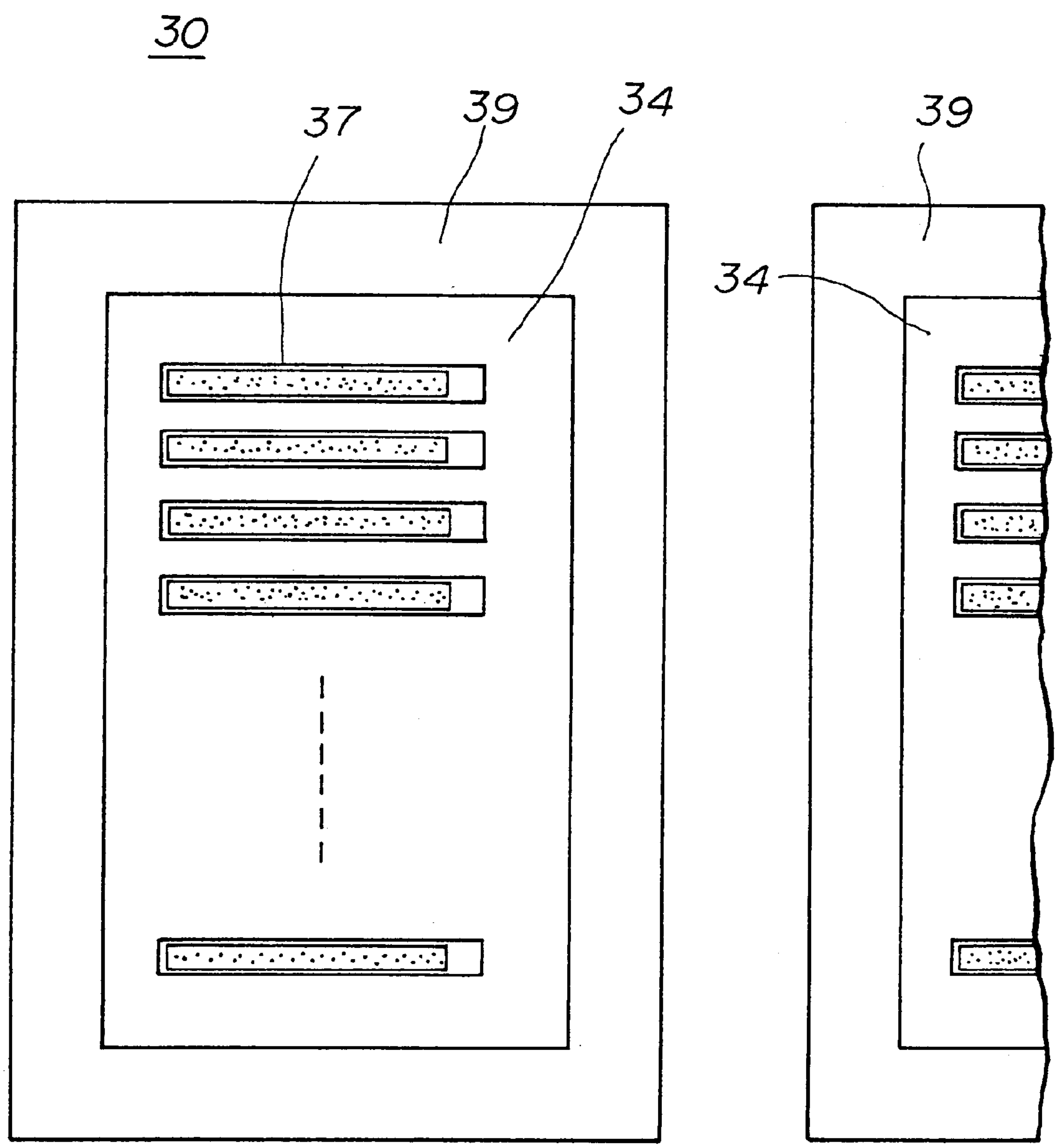
FIG. 4 is a diagram showing an ink-jet recording head having a diaphragm provided with a reinforcement member, the ink-jet recording head being previously devised by the inventors.

Further, the inventors of the above-described ink-jet recording head 30 made an invention of providing a reinforcement member 39 for the diaphragm 34 as shown in FIG. 4, for instance, to prevent a crack from being formed in the diaphragm 34. A patent application has been also filed for this (Japanese Patent Application No. 10-371033).

However, the technology of producing an ink-jet recording head using the thin-film deposition technology is new, and the above-described ink-jet recording head 30 still has room for improvement.

Figure 3A:
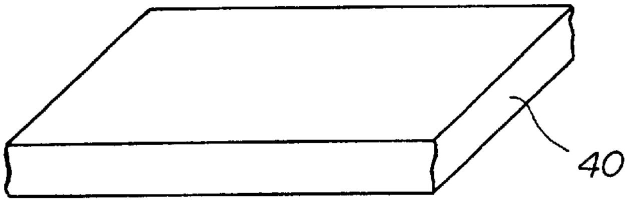
FIGS. 3(A) through 3(H) are diagrams showing a production process of an ink-jet recording head devised by some inventors of the present invention and another inventor.
Figure 3B:
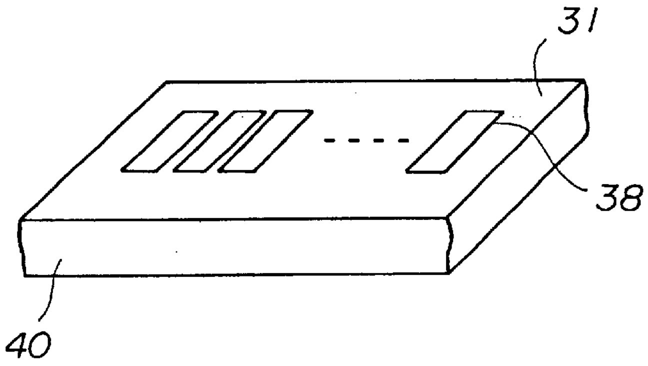
Figure 3C:
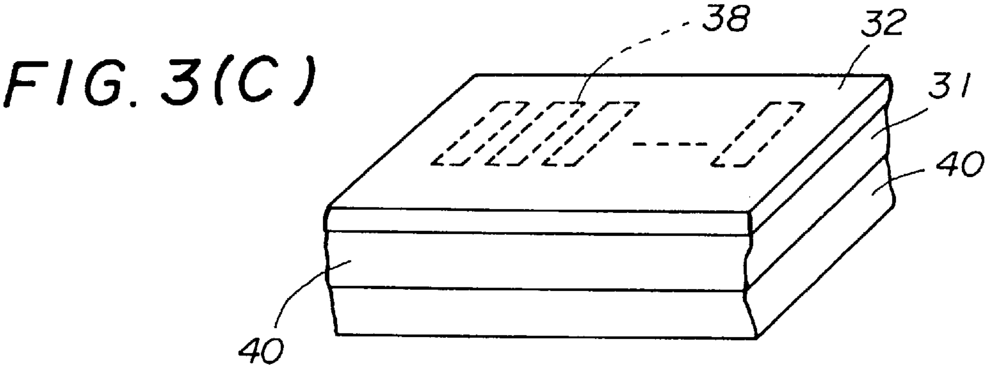
Figure 3D:
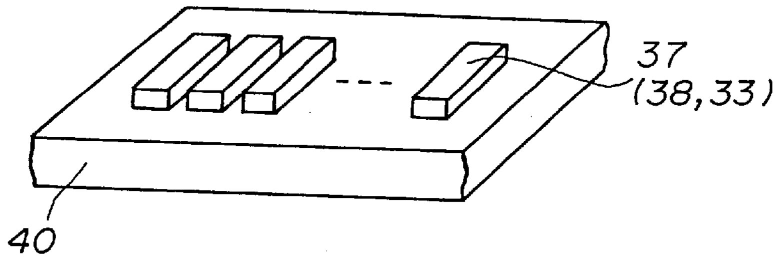
Figure 3E:
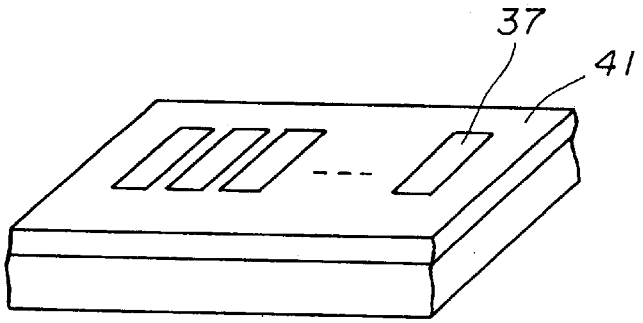
Figure 3F:
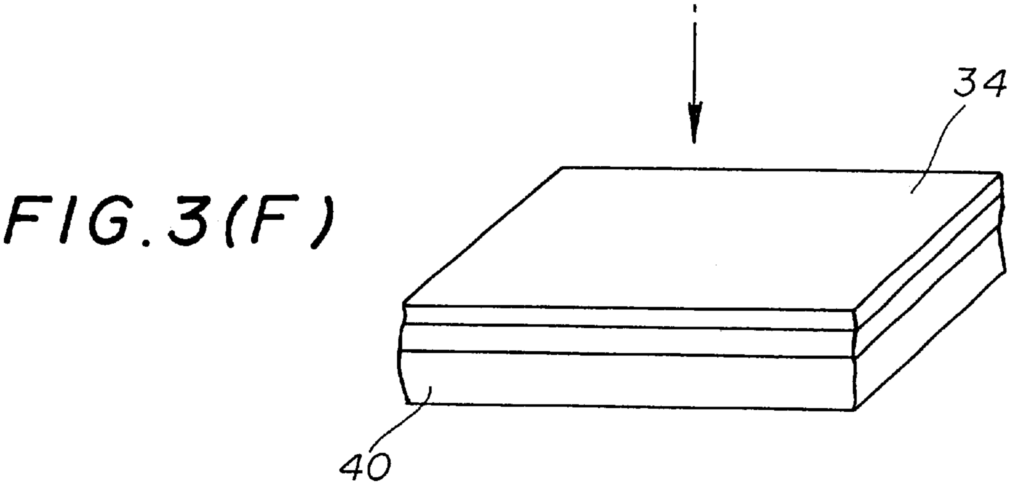
Figure 3G:
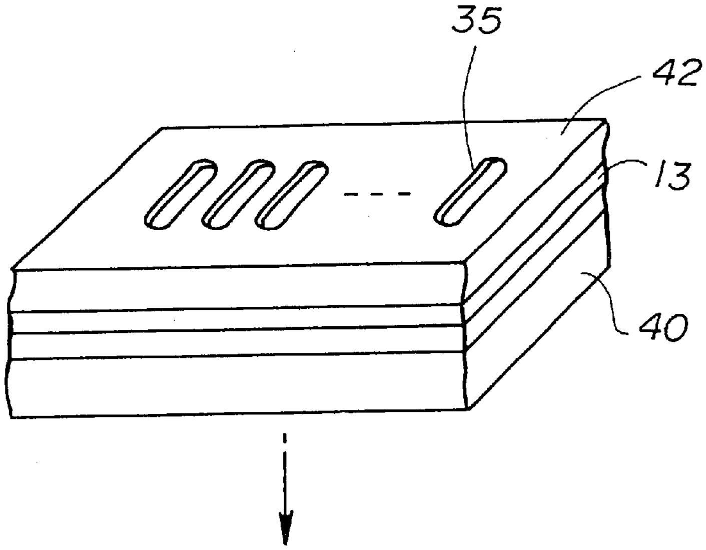
Figure 3H:
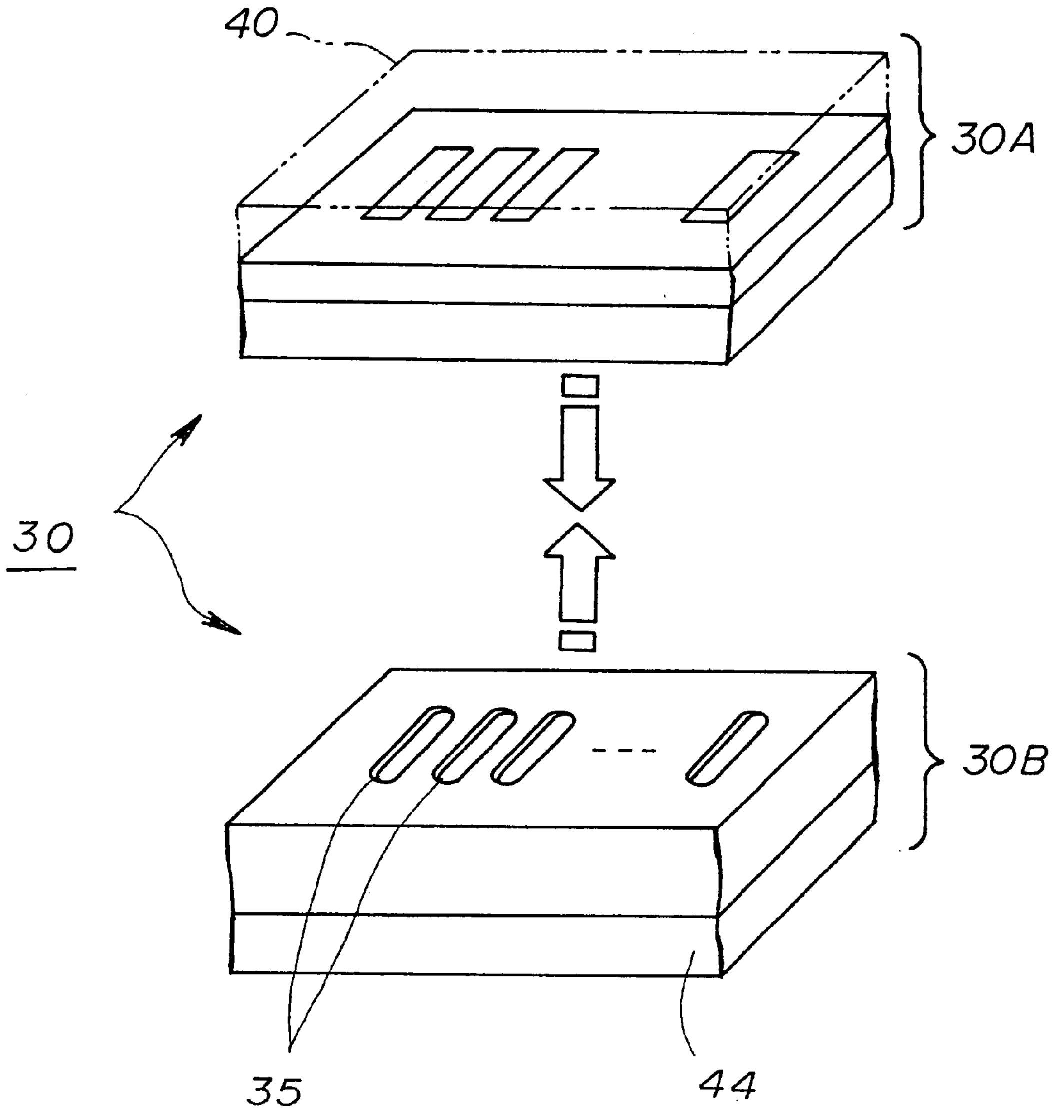

That is, in the production process shown in FIGS. 3(A) through 3(H), the Pt film 31 is formed on the substrate 40 by sputtering, and the individual electrodes 38 are formed by dividing the Pt film 31 (FIGS. 3(A), (B)). The piezoelectric layer 32 is formed all over the lamination of FIG. 3(B) by sputtering (FIG. 3(C)), and the piezoelectric layer 32 is divided into the piezoelectric elements 33 by wet etching so that the energy-generating elements 37, which are the laminations of the individual electrodes 38 and the piezoelectric elements 33, are formed (FIG. 3(D)). Therefore, patterning is performed twice, and the individual electrodes 38 and the piezoelectric elements 33 are positioned so as to be reliably superimposed so that the energy-generating elements 37 are formed.

Further, since the patterning employs wet etching, etching is performed isotropically so that inclined tapered parts are formed around the piezoelectric elements 33. The tapered parts exist around the piezoelectric elements 33 that contact the individual electrodes 38 (upper electrodes) and the diaphragm 34 (lower electrode) to generate displacement, and become non-displacement parts to which no voltage is applied. This restricts the displacement of the piezoelectric elements 33.

(Improvements to be Made in the Present Invention)

The inventors confirmed that improvements can be made, by performing patterning using ion milling, in the above-described two patterning processes, positioning of the individual electrodes 38 and the piezoelectric elements 33, and the tapered parts formed around the piezoelectric elements 33.

That is, ion milling has high etching anisotropy, so that the electrode layer 31 and the piezoelectric layer 32 can be processed at the same time. Accordingly, the electrode layer 31 and the piezoelectric layer 32 are successively formed on the substrate 40, and thereafter, the electrode layer 31 and the piezoelectric layer 32 in a layered state are etched by ion milling at the same time. Thereby, the energy-generating elements 37 formed of the individual electrodes 38 and the piezoelectric elements 33 can be formed in a single patterning process, and the positioning error can be eliminated. Thus, the energy-generating elements can be produced with high accuracy.

In the case of employing ion milling, however, a mixture of fine powders etched off the electrode layer 31 and the piezoelectric layer 32, and further the substrate 40 when ion milling is performed thereon, is deposited around and hardened so that wall-like deposits (hereinafter referred to as fences) are generated.

Figure 5:
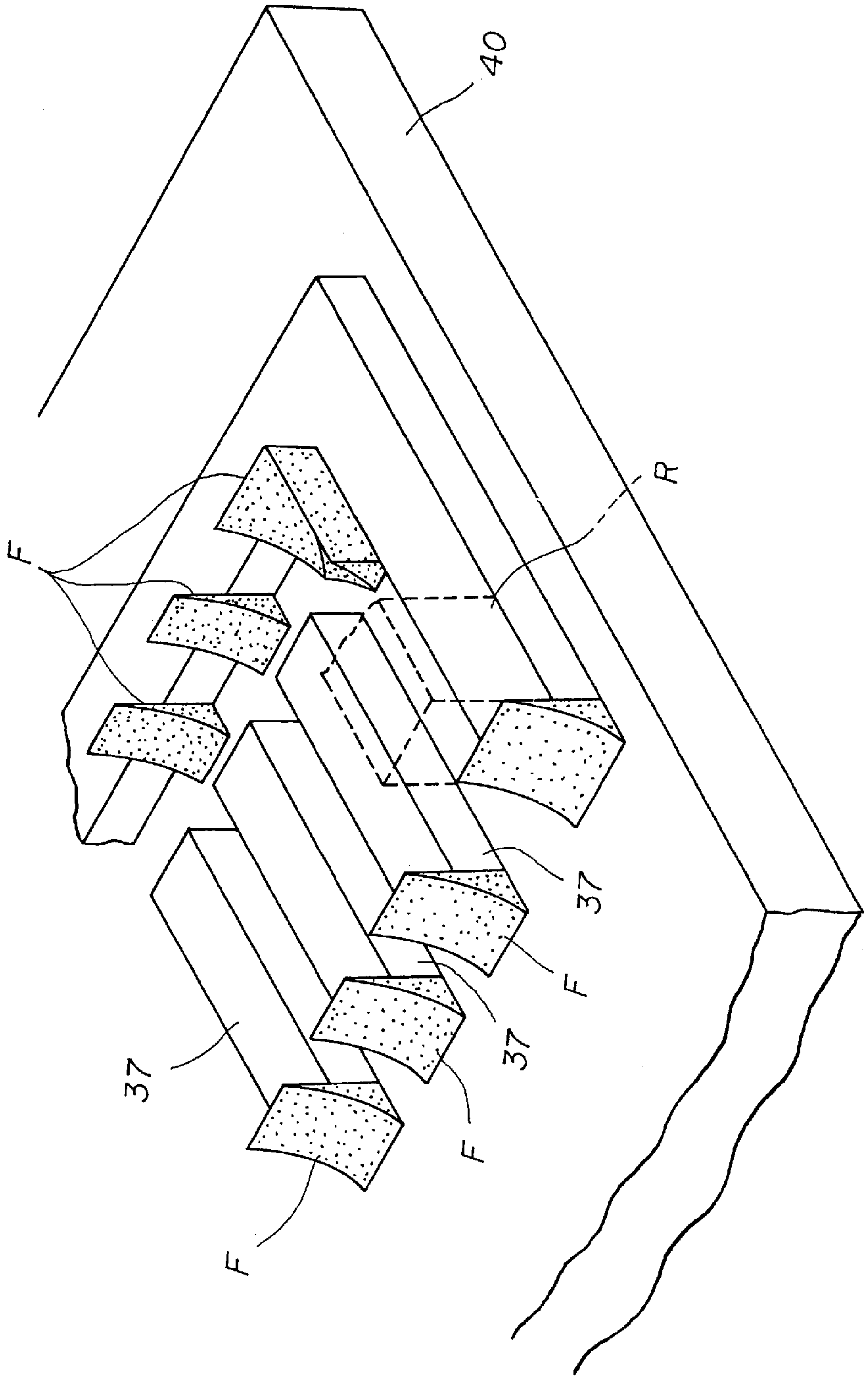
FIG. 5 is a diagram showing typical fences F formed around energy-generating elements.

FIG. 5 is a diagram showing typical fences F formed around the energy-generating elements 37. In processing by ion milling, a resist R is placed for protection on layer parts to be preserved so that unwanted parts are removed, hit by a high-speed argon gas. The parts preserved and divided by this operation later become an energy-generating part causing ink to be sprayed from the ink-jet recording head. As described above, these parts are the laminations of the individual electrodes 38 and the piezoelectric elements 33, and are described as the energy-generating elements 37 in this specification.

When ion milling is performed with the required resist R being placed on the lamination of the electrode layer 31 and the piezoelectric layer 32 formed on the substrate 40, the mixture of the fine powders etched off the electrode layer 31, the piezoelectric layer 32, and the substrate 40 is hardened to form the fences F. As shown in FIG. 5, the fences F are generated mainly at longitudinal end parts and adhere thereto.

FIG. 5 shows the state of the fences F after ion milling and removal of the resist R. The resist R exists on the upper surfaces of the protected parts immediately after the ion milling. With the resist R existing, the deposition of the fences F advances, using the resist R, partly indicated by a broken line, as upper-side support walls.

In ion milling, as described in FIGS. 3(A) through 3(H), a number of processes further follow, such as formation of the polyimide layer 41 as an insulating film and formation of the film of the diaphragm 34 so as to form the ink-jet recording head 30. Particularly, smoothness is required in the formation of the polyimide layer 41 and the diaphragm 34. Further, energy-generating elements 132 to which the fences F adhere are restricted in displacement.

(Description of the Present Invention)

A description will be given below of the present invention, in which the above-described aspects are improved.

According to the present invention, a production process of an ink-jet recording head using a thin-film deposition technology includes a step of forming energy-generating elements by etching by ion milling and dividing the lamination of an electrode layer and a voltage body layer formed on a substrate, and removing the fences F generated at the time of the formation of the energy-generating elements.

A detailed description will be given below, with reference to the drawings, of a method of producing an ink-jet recording head. FIGS. 6(A) through 6(M) show a production process of an ink-jet recording head according to an embodiment.

Figure 6A:
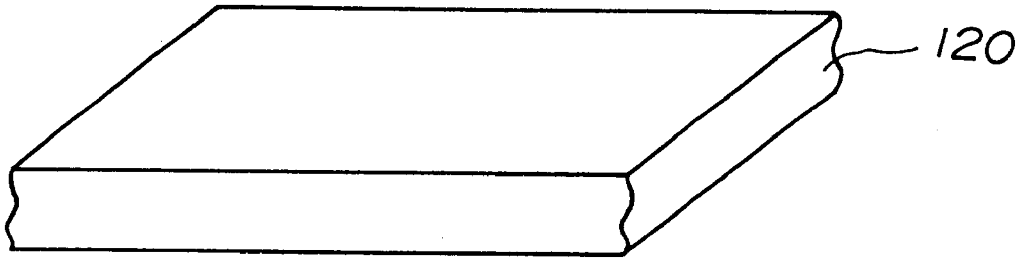
FIGS. 6(A) through 6(M) are diagrams showing a production process of an ink-jet recording head of an embodiment.

In order to produce an ink-jet recording head, first, a substrate 120 is prepared as shown in FIG. 6(A). As the substrate, a variety of conventionally known materials may be employed. In this embodiment, a magnesium oxide (MgO) single crystal of 0.3 mm in thickness is employed as the substrate 120.

Figure 6B:
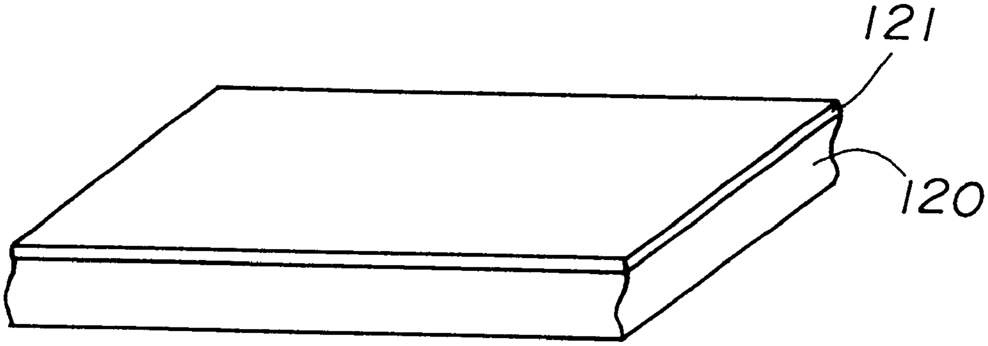
Figure 6C:
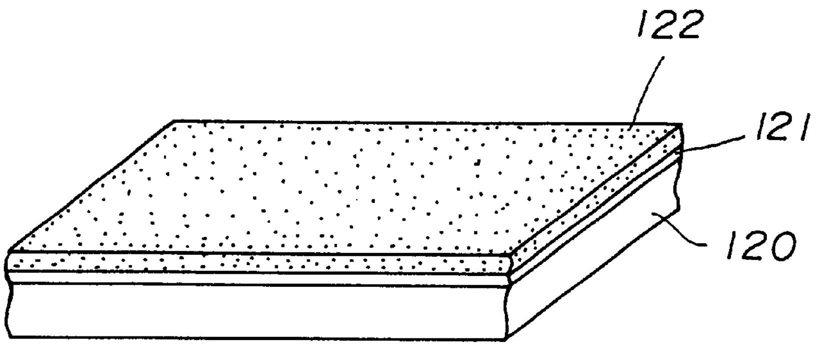

An electrode layer 121 of approximately 0.1 $\mu$m and a piezoelectric layer 122 of approximately 2 $\mu$m are successively formed on the substrate 120 by using a thin-film deposition technology of sputtering. Specifically, first, the electrode layer 121 is formed on the substrate 120 as shown in FIG. 6(B), and then the piezoelectric layer 122 is formed on the electrode layer 121 as shown in FIG. 6(C). In this embodiment, platinum (Pt) is used for the electrode layer and PZT (lead zirconate titanate) is used for the piezoelectric layer.

Next, etching is performed by ion milling so that laminations of the electrode layer 121 and the piezoelectric layer 122 are formed at positions corresponding to pressure chambers. An ion milling pattern used at this point is formed by a dry film resist (hereinafter referred to as a DF resist).

Figure 6D:
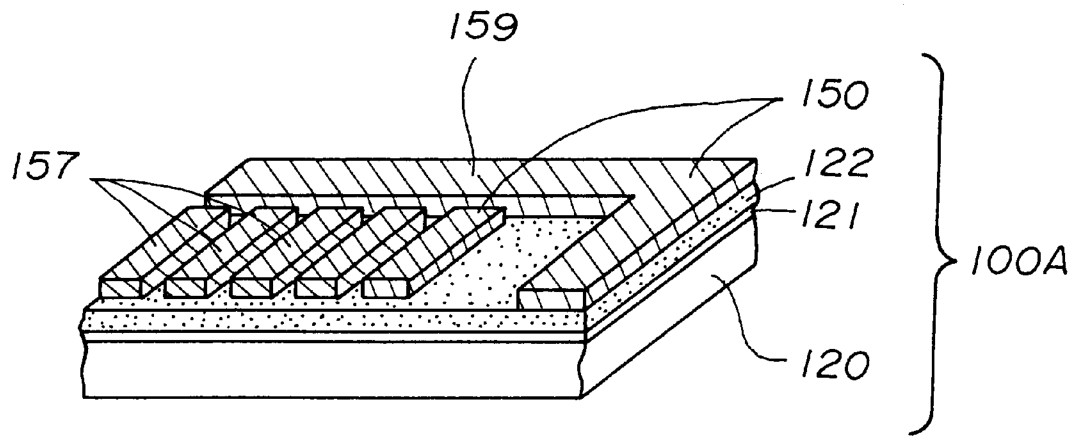

FIG. 6(D) shows a state where the DF resist pattern is formed. In this embodiment, positions 157 where the later-described energy-generating elements 132 are formed and a position 159 where an auxiliary frame body 139 for reinforcing a diaphragm 123 is formed are protected as parts to be preserved by a DF resist 150 of approximately 15 $\mu$m in thickness. In this embodiment, FI215 (an alkali-type resist: a product of TOKYO OHKA KOGYO CO., LTD.), which was employed as the DF resist 150, was laminated at 2.5 Kgf/cm at 1 m/s at 115° C., subjected to exposure of 120 mJ with a glass mask, preheated at 60° C. for 10 minutes, cooled down to room temperature, and developed with a 1 wt. % $Na_2CO_3$ solution, so that the pattern was formed.

Figure 6E:
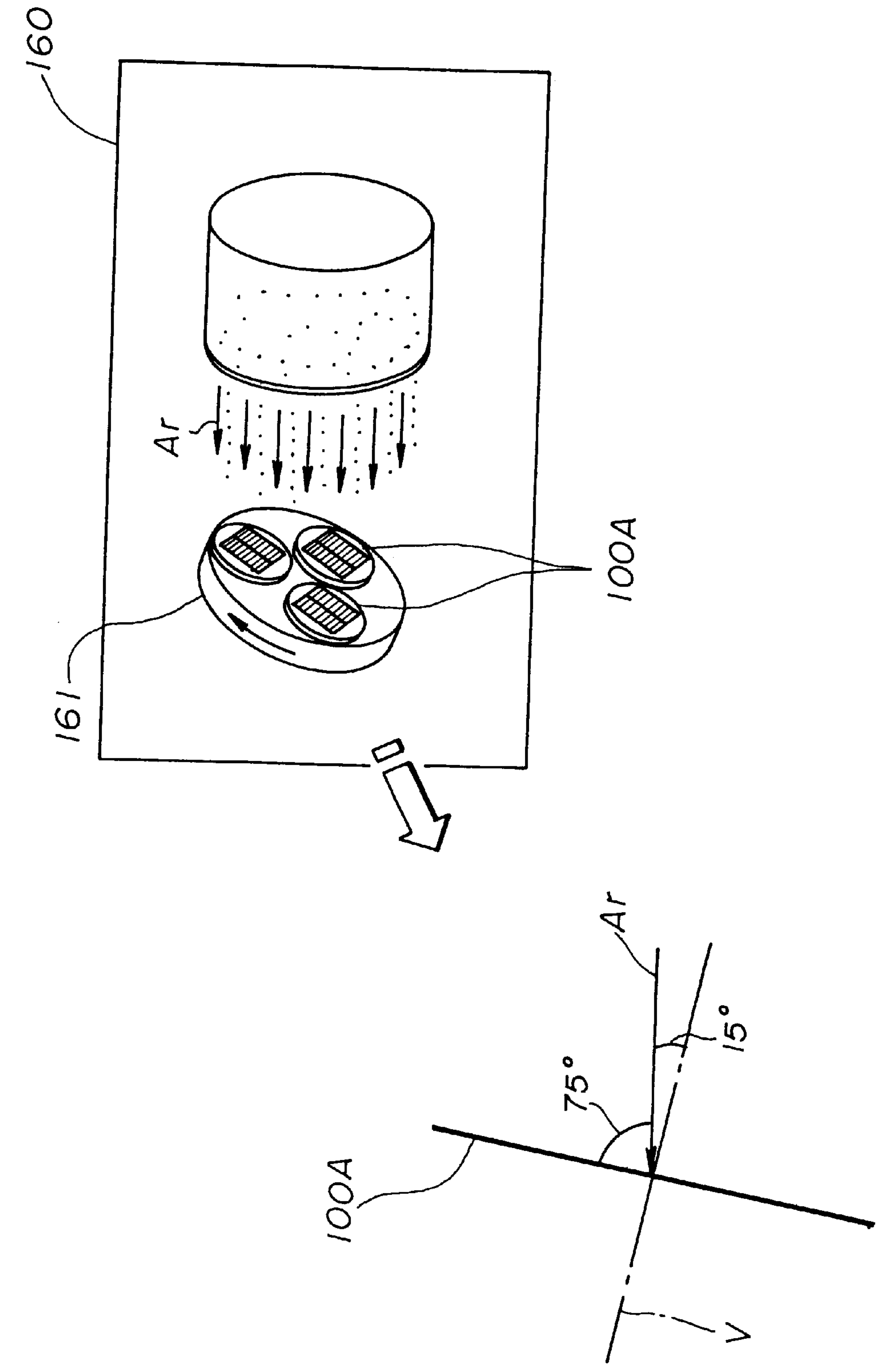

Next, as shown in FIG. 6(E), ion milling was performed in an ion milling device 160 so that the energy-generating elements 132 are formed in a lamination 100A of FIG. 6(D). The ion milling device 160 has high vacuum inside and includes an ion source where gas such as argon (Ar) gas is bombarded with thermoelectrons discharged from a hot wire (filament) to produce ions. The ions from the ion source are formed into a parallel beam to be emitted onto a sample so that the sample is etched. A holder 161 on which the sample is placed is provided rotatably in the ion milling device 160 although means for driving the holder 161 is not shown in FIG. 6(E). Further, an angle at which the ion beam is emitted (ion milling angle) can be varied by changing the inclination of the holder 161.

In this embodiment, the substrate 120 was fixed to a copper holder 160 with grease of good heat conductance, and ion milling was performed using only argon (Ar) gas at approximately 700 V at an ion milling angle of approximately 15°.

The ion milling angle here is an angle formed by the perpendicular V of the lamination 100A and the direction in which the argon gas is emitted. An enlarged view is shown circled in FIG. 6(E) to help understand this relationship.

Figure 6F:
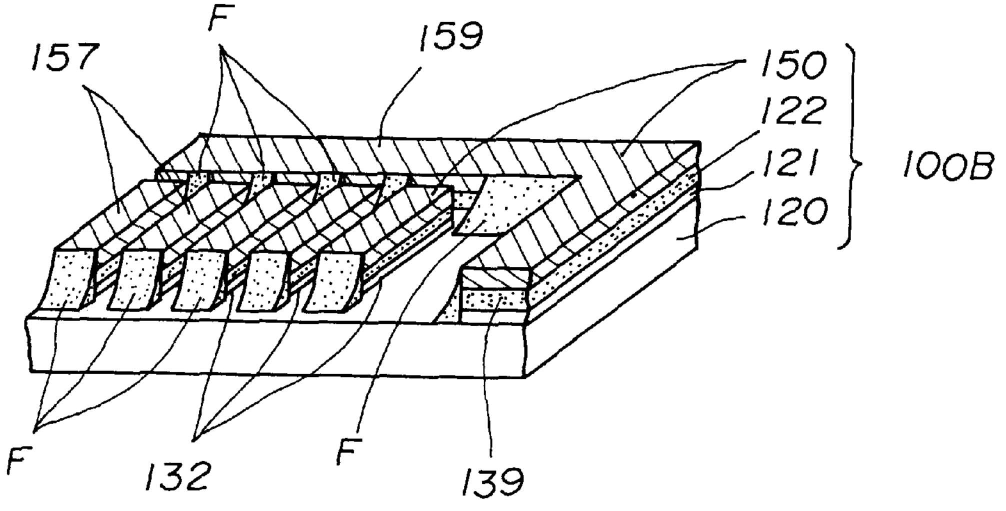

A state shown in FIG. 6(F) was entered as a result of the above-described ion milling. The taper angle of parts subjected to the ion milling in the depth direction had a perpendicularity of over 85° to the lamination surface. By this ion milling, the energy-generating elements 132 were formed under the positions 157 of the DF resist 150, and the auxiliary frame body 139 was formed under the position 159 of the DF resist 150.

On the other hand, by this ion milling, the fences F were formed on the longitudinal end faces of the energy-generating elements 132 and in the regions of the inner wall of the auxiliary frame body 139 in which regions no energy-generating elements 132 exist. If the DF resist is removed from the state of FIG. 6(F), the fences F remain protruding from the energy-generating elements 132 and the auxiliary frame body 139 (See FIG. 5). These fences F are to be removed since these fences F have negative effects on the subsequent formation of the diaphragm 123 requiring smoothness, and restrict the energy-generating elements 132 in displacement.

Figure 6G:
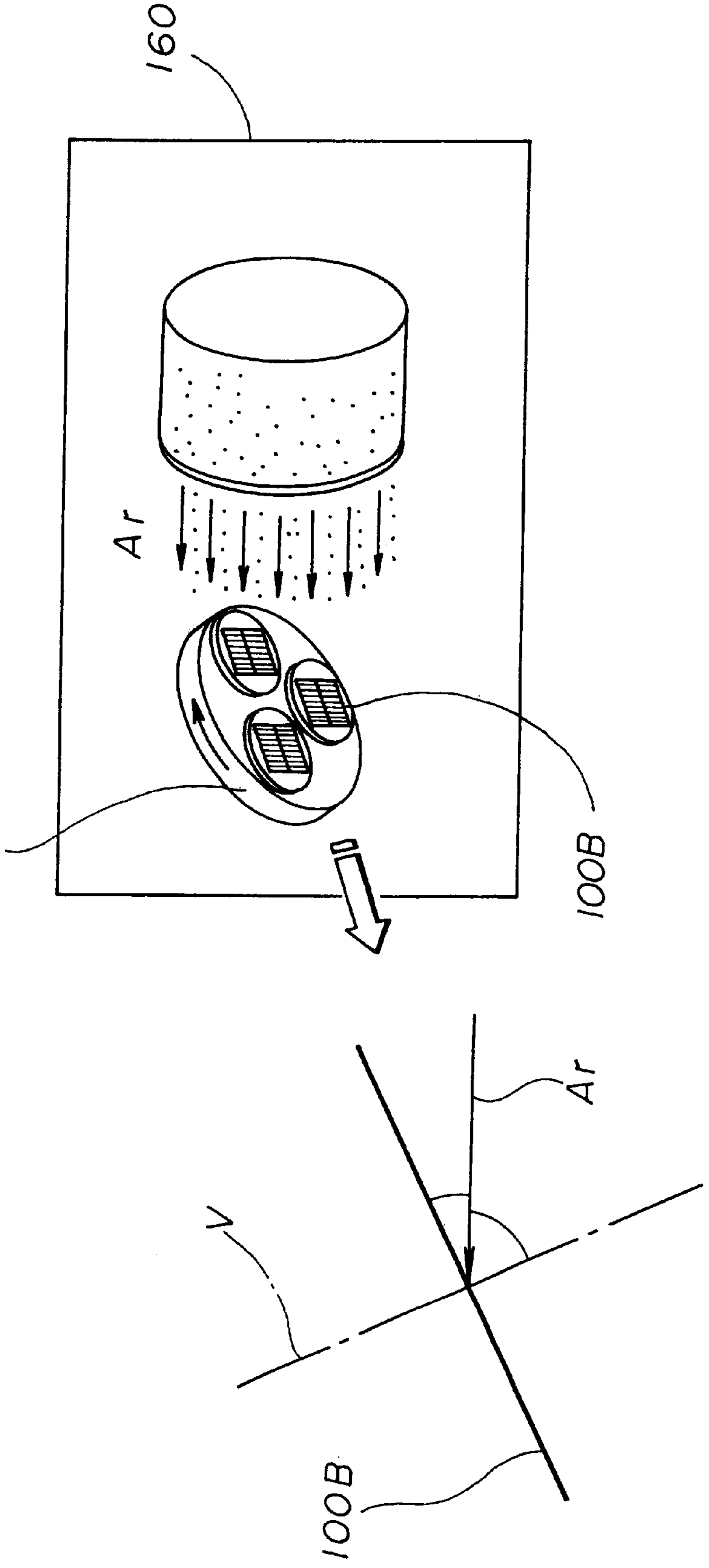

Accordingly, in this embodiment, as shown in FIG. 6(G), ion milling was again performed on a lamination 100B with the DF resist 150 of FIG. 6(F) being placed on the upper surface thereof. This ion milling functions as means for removing the fences F.

That is, in the ion milling of FIG. 6(E), the argon gas was emitted onto the surface of the lamination 100A at an angle approximating a right angle in order to form the energy-generating elements 132 in the lamination 100A, while in this ion milling, the argon gas is emitted at an ion milling angle flatter than a right angle so that the fences F are removed. Preferably, the ion milling angle for removal of the fences F shown in FIG. 6(G) is in the range of approximately 45 to 81°, and more favorably, of approximately 76 to 81°. At ion milling angles within this range, etching can be performed for removal of the fences F without further etching the exposed substrate 120. However, if the ion milling angle exceeds 81°, the fences are in the shade of the resist pattern so that argon is prevented from being emitted to the fences. In this embodiment, the electrode layer is approximately 0.1 μm, the piezoelectric layer is approximately 2 μm, the DF resist is approximately 15 μm, the nozzle pitch is approximately 1/150 inch, the formed energy-generating element 132 is approximately 80 μm in width, and the ion milling angle is 81°.

Further, it was confirmed in the experiments that, letting an ion milling rate for the PZT be 100 in this embodiment, the employed resist (FI215, 15 μm) was etched at a 65% rate. If ion milling is performed for a depth of 2 μm, for instance, the resist is reduced to 1.3 μm in thickness.

Letting the PZT be 80 μm with the pitch being 1/150 inch (approximately 169 μm) in the pattern of this embodiment, an ion milling width is 89 μm and the resist thickness, which was initially 15 μm, is processed to 13.7 μm. A maximum angle for removal of the fences is calculated to be 80.9° from the above-described equation for obtaining θ. However, when a variation in the thickness of the resist is considered, approximately five degrees are subtracted so that an optimum angle for fence removal is approximately 76° (the angle cannot be set to decimals).

If the same process as described above is performed when the element pitch is 1/300 inch (approximately 84.7 μm. An optimum PZT width is 40 μm at this point), for instance, the ion milling angle is in the range of approximately 0 to 56°, favorably smaller than or equal to 45°, in the pattern formation, and the angle for fence removal is approximately 68°.

An enlarged view is also shown circled in FIG. 6(G) to help understand the ion milling angle.

Figure 6H:
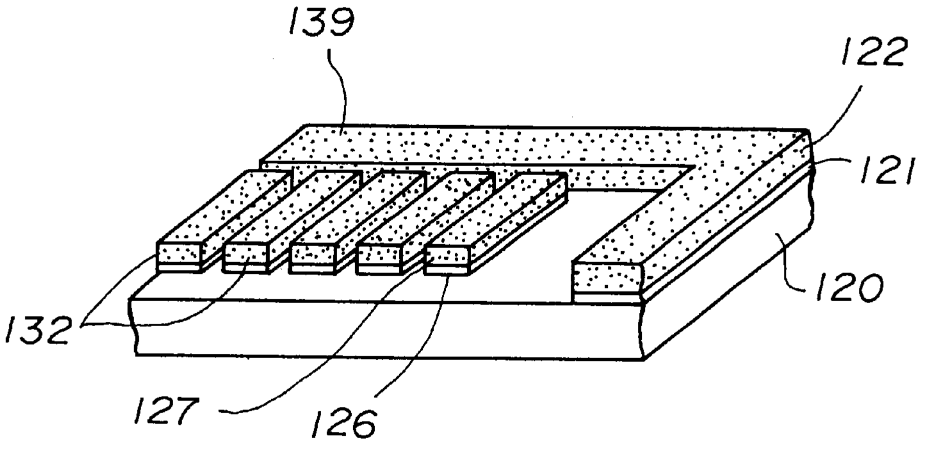

FIG. 6(H) shows a state where the fences F are thus removed and the DF resist 150 is removed. The energy-generating elements 132 and the auxiliary frame body 139 are formed on the substrate 120. The energy-generating elements 132 are the laminations of piezoelectric elements 127 and individual electrodes 126.

Figure 6I:
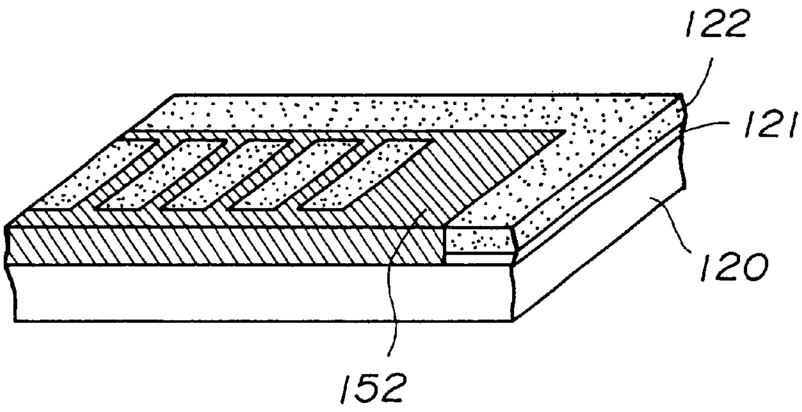

Thereafter, as shown in FIG. 6(I), a planarized insulating layer 152 is formed so that the diaphragm 123 is formed to be flat and the ion-milled parts are insulated.

Figure 6J:
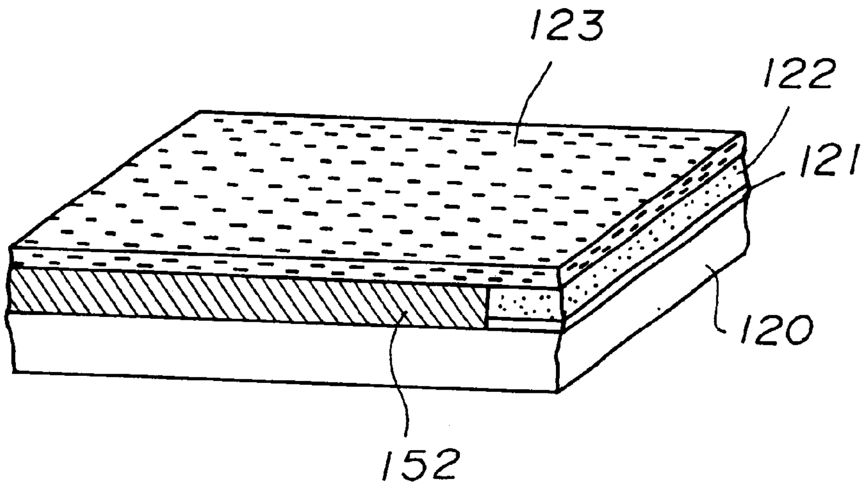

Next, as shown in FIG. 6(J), the diaphragm 123 is formed by sputtering so that the lamination part of the diaphragm 123 and the energy-generating elements 132 serving as parts for generating energy for ink ejection. Ni—Cr or Cr can be used as a material for the diaphragm 123.

Figure 6K:
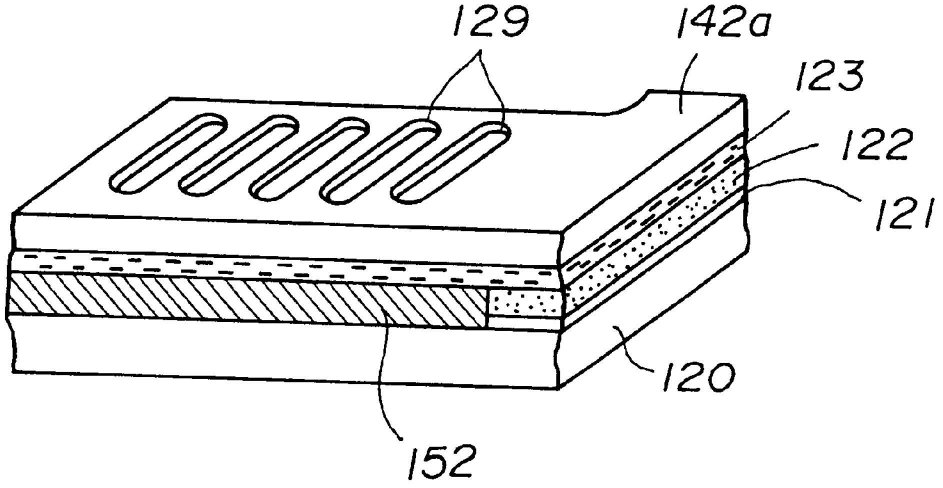

When the formation of the layers 121 through 123 using the thin-film deposition technology including ion milling is thus completed, next, as shown in FIG. 6(K), pressure chamber openings are formed at positions corresponding to the energy-generating elements 232 of the layers 121 through 123. In this embodiment, the pressure chamber openings were formed by using a dry film resist of a solvent type. The dry film resist employed herein was a PR-100 series product (of TOKYO OHKA KOGYO CO., LTD.), and was laminated at 2.5 Kgf/cm at 1 m/s at 35° C., aligned and subjected to exposure of 180 mJ by using a glass mask and alignment marks in the pattern of the piezoelectric layer 122 (and the electrode layer 121) at the time of the ion milling, preheated at 60° C. for ten minutes, cooled down to room temperature, and developed with C-3 and F-5 solutions (of TOKYO OHKA KOGYO CO., LTD.), so that the pattern was formed.

Figure 6L:
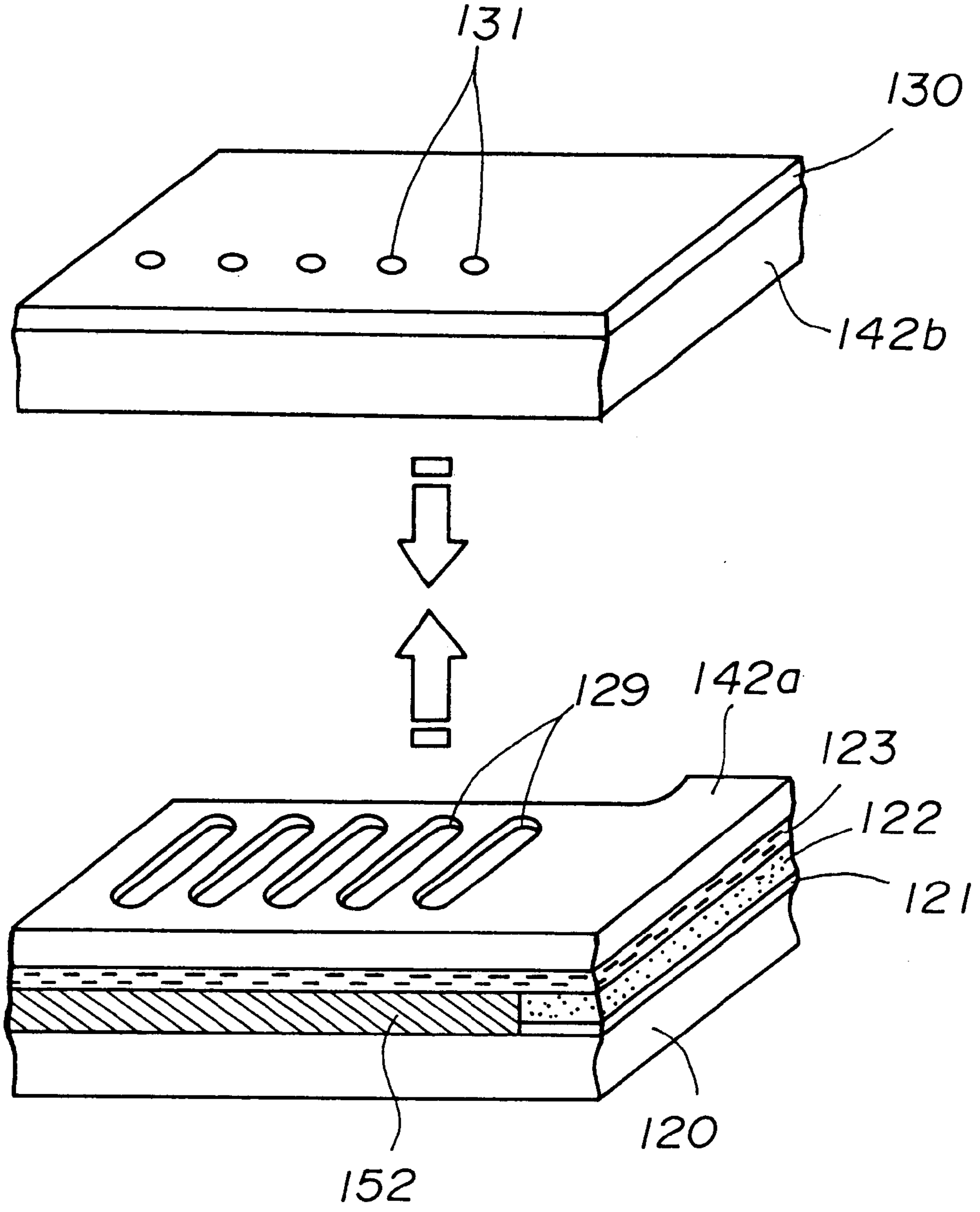

On the other hand, as shown in FIG. 6(L), a main body part 142*b* having pressure chambers 129 and a nozzle plate 130 are formed by performing a process different from the above-described process. The main body part 142*b* having the pressure chambers 129 is formed by repetitively performing, a required number of times, lamination, exposure, and development of a dry film (a solvent-type dry film, a PR series product of TOKYO OHKA KOGYO CO., LTD.) on the nozzle plate 130 (having alignment marks not shown in the drawing).

A specific method of forming the main body part 142*b* is as follows. That is, the pattern of guide channels 141 (60 μm in diameter and 60 μm in depth) for guiding ink from the pressure chamber 129 to nozzles 131 (20 μm in diameter, straight holes) and directing ink flow to one direction is exposed on the nozzle plate 130 (approximately 20 μm in thickness) by using the alignment marks of the nozzle plate 130, and then, like an ink channel 133, the pressure chambers 129 (approximately 100 μm in width, approximately 1700 μm in length, and approximately 60 μm in thickness) are exposed by using the alignment marks of the nozzle plate 130. Thereafter, left out (at room temperature) for ten minutes and subjected to heat hardening (60° C., ten minutes), the dry film had its unnecessary parts removed by solvent development.

As shown in FIG. 6(L), the main body part 142*b* provided with the nozzle plate 130 thus formed is joined to the other main body part 142*a* having the energy-generating elements 132. At this point, the main body parts 142*a* and 142*b* are joined so as to oppose each other with accuracy in the parts of the pressure chambers 129. The joining was achieved using the alignment marks of the energy-generating elements 132 and the alignment marks formed on the nozzle plate 130. Preheating was performed at 80° C. for an hour with a load of 15 $Kgf/cm^2$, permanent joining was performed at 150° C. for 14 hours, and natural cooling was performed.

Next, a region corresponding to a driving part is removed from the substrate 120 so that the energy-generating elements 132 serving as an energy-generating part can oscillate. The substrate 120 is turned upside down so that the nozzle plate 130 is positioned on the lower side, and the substantially central part of the substrate 120 is removed by wet etching so that an opening part 124 is formed.

Figure 6M:
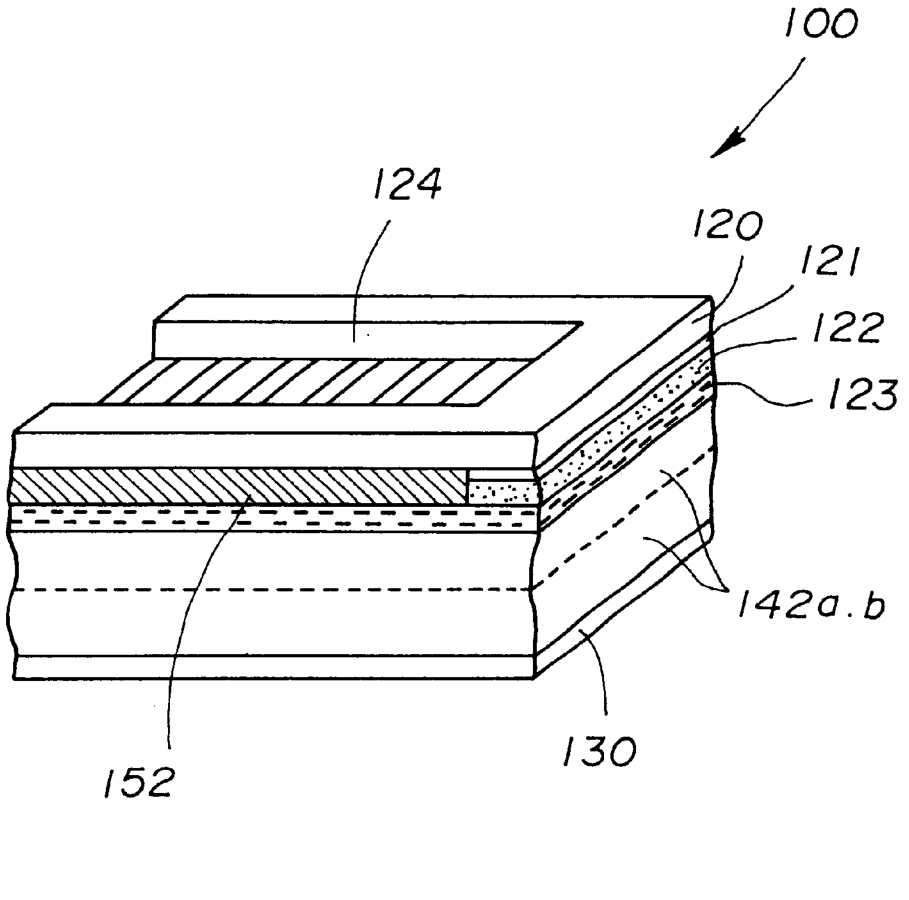

The position at which the opening part 124 is formed is selected to correspond at least to regions of the diaphragm 123 which regions are deformed by the energy-generating elements 132. By forming the opening part 124 by removing the substrate 120, the individual electrodes 126 (energy-generating elements 132) are exposed through the opening part 124 in the substrate 120 as shown in FIG. 6(M).

As described above, according to this embodiment, the electrode layer 121 and the piezoelectric layer 122 are etched by ion milling at the same time, so that the ink-jet recording head 100 having the energy-generating elements 132 that have a good crystalline characteristic and are free of positioning errors can be produced.

When the energy-generating elements 132 are formed by ion milling, the fences F adhere to the end parts of the energy-generating elements 132. However, the fences F can be removed by performing ion milling with a different ion milling angle in the device used to form the energy-generating elements 132. Therefore, this embodiment can be carried out with ease by using the same facilities that are used to form the energy-generating elements 132, thus preventing an increase in the production costs.

Figure 7:
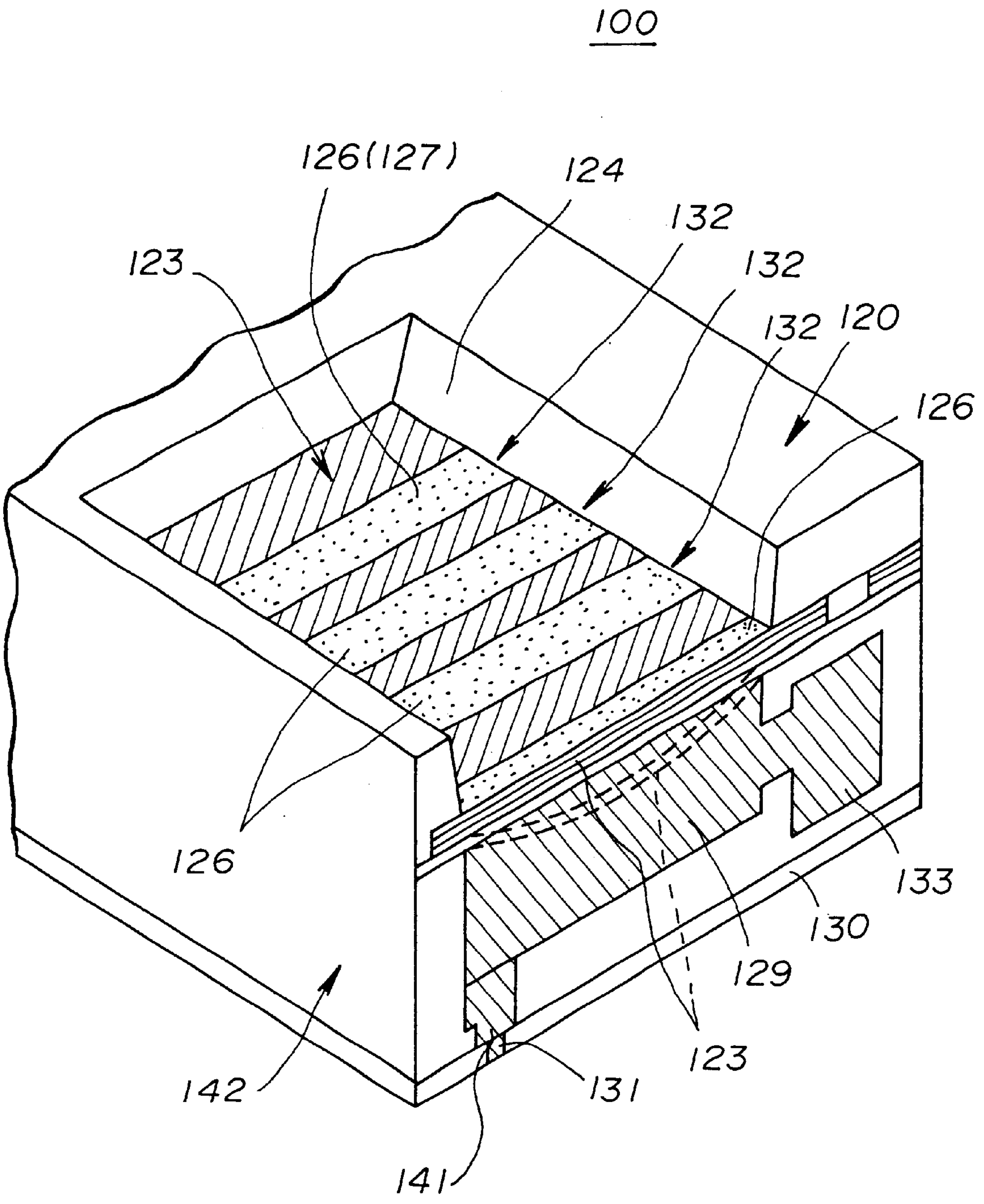
FIG. 7 is a perspective view of the ink-jet recording head produced by the production process of the embodiment, showing an outline of the ink-jet recording head.

The ink-jet recording head 100 produced through the above-described production process is described above, while a description will now be given of the structure thereof based on the perspective view of FIG. 7.

The ink-jet recording head 100 is composed mainly of the substrate 120, the diaphragm 123, a main body part 142, the nozzle plate 130, and the energy-generating elements 132.

The main body part 142 has a layered structure of dry films, and has the pressure chambers 129 (ink chambers) and the ink channel 133 serving as an ink supply channel formed thereinside. In the diagram, an open part is formed above the pressure chambers 129, and the ink guide channels 141 are formed on the lower surfaces of the pressure chambers 129.

Further, in the diagram, the nozzle plate 130 is provided on the lower surface of the main body part 142, and the diaphragm 123 is provided on the upper surface of the main body part 142. The nozzle plate 130 is formed of stainless steel, for instance, and has the nozzles 131 formed at positions opposing the ink guide channels 141.

The diaphragm 123 is a flexible plate-like material formed of chromium (Cr), for instance, and the substrate 120 and the energy-generating elements 132 are provided thereon. The opening part 124 is formed in the central position of the substrate 120. The energy-generating elements 132 are formed on the diaphragm 123 and are exposed through the opening part 124.

The energy-generating elements 132 are formed of the laminations of the individual electrodes 126 and the piezoelectric elements 127 formed on the diaphragm 123 (functioning as a lower common electrode as well). The energy-generating elements 132 are formed at the positions corresponding to positions at which the pressure chambers 129 are formed in the main body part 142.

The individual electrodes 126 are formed on the-upper surfaces of the piezoelectric elements 127. The piezoelectric elements 127 are crystals that generate voltage effect when voltages are applied thereto, and are PZT (lead zirconate titanate) in this embodiment. In this embodiment, the piezoelectric elements 127 are independently formed at the positions where the pressure chambers 129 are formed.

In the ink-jet recording head 100 having the above-described configuration, when voltages are applied between the diaphragm 123 functioning also as a common electrode and the individual electrodes 126, the piezoelectric elements 127 generate distortions due to the piezoelectric effect. When distortions are generated in the piezoelectric elements 127, the diaphragm 123 deforms accordingly.

The distortions generated in the piezoelectric elements 127 at this point cause the diaphragm 123 to deform as indicated by broken lines in the drawing. That is, the diaphragm 123 is configured so as to deform to protrude toward the pressure chambers 129. Therefore, ink in the pressure chambers 129 is pressurized by the deformation of the diaphragm 123 caused by the distortions of the piezoelectric elements 127 so as to be ejected outside through the ink guide channels 141 and the nozzles 131. Thereby, printing is performed on a recording medium such as a sheet of paper.

In FIG. 6(G) shown in the above-described production process of the ink-jet recording head, the fences F are removed by ion milling, while means for removing the fences F is not limited to this.

Figure 8A:
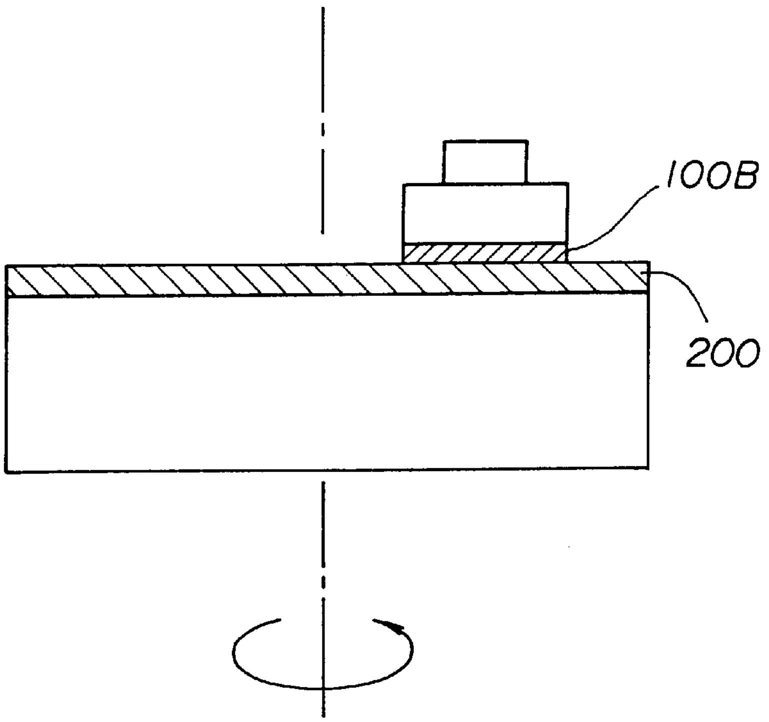
FIGS. 8(A) and 8(B) are diagrams showing other means for removing the fences.
Figure 8B:
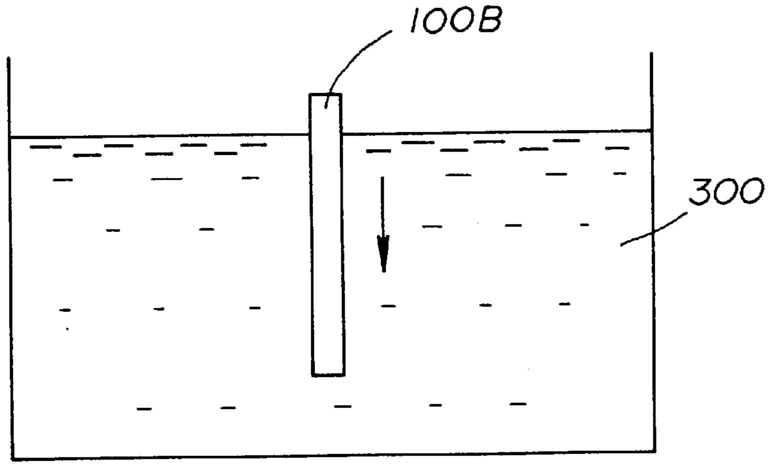

FIGS. 8(A) and 8(B) show other means employable in the process of removing the fences F.

FIG. 8(A) shows a case employing CMP (chemical mechanical polishing) as means used in the process of removing the fences F. FIG. 8(A) shows the way the lamination 100B of FIG. 6(F) has the fences F planarized by a polishing pad 200. A polyurethane sheet or a nonwoven fabric may be employed as the polishing pad 200 used herein. A slurry that is a mixture of water including a pH regulator and abrasive grains of silica or alumina is prepared as a polishing agent, and polishing is performed with the lamination 100B and the polishing pad 200 being rotated with respect to each other while the slurry is being poured.

FIG. 8(B) shows a case where another wet etching method is employed as means used in the process of removing the fences F. FIG. 8(B) shows the lamination 100B of FIG. 6(F) soaked in an etchant 300. Nitric acid may be employed as the etchant 300 used herein.

Isotropic etching is performed in wet etching, but etching for removing the fences F is performed for a short period of time so that the amount etched is small. Further, the RF resist 150 is placed on the upper surface of the lamination 100B. Accordingly, this wet etching is prevented from damaging the energy-generating elements 132 having preferable sections as previously described.

Thus, the description of a preferred embodiment of the present invention has been given above, while the present invention is not limited to the specifically disclosed embodiment, but variations and modifications may be made without departing from the scope of the important aspects of the present invention later described in claims.

Thus, according to the present invention described in detail, in an ink-jet recording head using a thin-film deposition technology, an electrode layer and a piezoelectric layer are etched at the same time by using ion milling. Therefore, downsized energy-generating elements having integrality can be produced with high accuracy. Further, since fences caused to adhere to the energy-generating elements by ion milling are removed in a fence removal process, an insulating film and a diaphragm can be formed after the planarization. Therefore, a downsized ink-jet recording head with high accuracy can be produced at a high yield rate, so that cost reduction can be realized.

Particularly, in the case of employing ion milling in the fence removal process, the same facilities used to form the energy-generating elements can be used with a different ion milling angle. Therefore, the removal process can be performed at low cost.

What is claimed is:

1. A method of producing an ink-jet recording head, the method comprising the steps of:

forming a piezoelectric layer subsequent to an electrode layer on a substrate by using a thin-film deposition technology;

forming an energy-generating element for generating energy for ink ejection by etching the electrode layer and the piezoelectric layer simultaneously by an ion milling, wherein the ion milling process creates deposits of mixed fine powders including those etched off the electrode layer and the piezoelectric layer by the ion milling process; and removing a fence formed by the deposits of mixed fine powders.

2. The method as claimed in claim 1, wherein ion milling is performed in the step of removing the fence.

3. The method as claimed in claim 2, wherein an ion milling angle in the step of removing the fence is greater than an ion milling angle in the step of forming the energy-generating element.

4. The method as claimed in claim 3, wherein the ion milling angle in the step of removing the fence is set to fall within a range of a maximum to an angle smaller than the maximum by five degrees, the maximum being an angle formed by a wall height after the energy-generating element is formed and a straight line connecting the wall height and a diagonally positioned bottom in the ion milling formation, the wall height including a height of a resist;

and the ion milling angle in the step of forming the energy-generating element is set so that a maximum of the ion milling angle is an angle connecting a center of a minimum ion milling opening part width and an end of an opening on a resist surface in a pattern to be processed.

5. The method as claimed in claim 1, wherein CMP is performed in the step of removing the fence.

6. The method as claimed in claim 1, wherein wet etching is performed in the step of removing the fence.

* * * * *